(12) United States Patent
Knapp

(10) Patent No.: US 7,389,392 B2
(45) Date of Patent: Jun. 17, 2008

(54) CHIP PROCESSORS WITH INTEGRATED I/O

(76) Inventor: Benjamin P. Knapp, 1940 Bluffview Dr., Byron Center, MI (US) 49315

( * ) Notice: Subject to any disclaimer, the term of this patent is extended or adjusted under 35 U.S.C. 154(b) by 411 days.

(21) Appl. No.: 11/262,491

(22) Filed: Oct. 29, 2005

(65) Prior Publication Data

US 2006/0155899 A1    Jul. 13, 2006

Related U.S. Application Data

(60) Provisional application No. 60/625,731, filed on Nov. 5, 2004.

(51) Int. Cl.
*G06F 13/38* (2006.01)

(52) U.S. Cl. ..................... 711/155; 711/114

(58) Field of Classification Search ............... 711/114, 711/155, 164, 171, 202; 710/72
See application file for complete search history.

(56) References Cited

U.S. PATENT DOCUMENTS 7,124,261 B2 * 10/2006 Kimelman et al. ......... 711/155

* cited by examiner

*Primary Examiner*—Vu A Le
(74) *Attorney, Agent, or Firm*—Clifford Kraft

(57) ABSTRACT

A solution to the read-modify-write problem for mixed tri-state chip processors by implementing a simple hardware change. This change could easily be built into microcontrollers and other chip processors to once and for all solve the problem. The present invention uses at least one logic gate to route data from the output of the data register back to itself instead of from the input pin during reads; the correct value stays in the output register at all times.

6 Claims, 3 Drawing Sheets

CHIP PROCESSORS WITH INTEGRATED I/O

This application is related to and claims priority from U.S. provisional application No. 60/625,731 filed Nov. 5, 2004. Application 60/625,731 is hereby incorporated by reference.

BACKGROUND

1. Field of the Invention

The present invention relates to chip processors and more particularly to a solution to a current problem encountered with chip processors such as microcontrollers.

2. Description of the Current Art

In a chip processor such as a microcontroller or microprocessor based system it is common to desire to control an individual bit in an output port from software. In order to control one bit without effecting the other bits it is common practice to perform a read of the port then to mask this data with a logical AND operation or a logical OR operation and then write this data back to the port. For example, assuming an 8 bit port(bits 7 through bits 0)in which the programmer wants to set bit 3 (this is the 4th bit), the software would first read the port, then logically OR the data read with the value 08h (00001000 in binary). This sets the bit. Finally the software would write this changed data back to the port. To clear a bit in the port without effecting the other bits, the software would read the port and logically AND the read data with a mask value and then write it back to the port (F7h (11110111 binary) for the above case). This practice is known as a "read modify write operation". The same concept applies to ports of any width.

Many modern chip processors such as microcontrollers have integrated I/O ports built onto the same chip. Often these ports are designed so they can be dynamically configured to operate either as an input or an output port on a bit by bit basis. In other words, each bit within a port can be dynamically configured as either an input or an output. It is also common to have efficient instructions (op-codes) for the setting or clearing the bits of ports. These instructions normally are capable of performing "read modify read-modify-write" operation directly in hardware by with a single op-code. This saves program space, and more importantly, program execution time.

In a microcontroller based system it is necessary in some cases to have what is called an open drain output where a pin is driven low from a floating state (MOS refers to Metal Oxide Semiconductor transistors common in most microcontrollers). Sometimes this is referred to as an open collector output, using Bipolar Junction Transistor BJT terminology whether or not the system actually uses a BJT or MOS transistor in its output. Sometimes an open source output is used instead of an open drain. The present invention relates equally to open source outputs where a pin is driven a from a floating state to a high state. In the open drain case, an output the pin is either be driven low (where it sinks current) usually representing a binary 0 or allowed to go into a high impedance state (where it draws no current, allowing others to read it or pull it to a fixed level) usually representing a binary 1. Sometime this high impedance state is referred to as a tri-state (or that the line is tri-stated).

It is common practice in the art, and is recommended by many microcontroller manufactures, to implement open drain (or open source) outputs (tri-stated outputs) by configuring the pin as an input rather than an output and using a pull-up or pull-down resistor similar to any tri-state configuration. This permits the manufacturer to implement tri-state configurations (to drive a tri-state bus) without having to actually supply output drivers with three states.

To achieve a workable circuit, the value in the pin output data register is set low for the open drain case with the output pulled high with a resistor. When the pin is configured as an input, goes to a high impedance state and is pulled high by the resistor. When it is desired to drive the pin to a zero (allow it to sink current), the configuration of the pin is changed to be an output. Since there is a 0 in the output data register, the pin is immediately driven low. So instead of setting the data bit high or low as needed in the case of a normal output configuration, the output is driven between the high impedance state and the zero driven state by toggling the input/output configuration bit (commonly called the data direction or DDR bit). The pin can also be used as a receiver or input simply by leaving it configured as an input and reading it in the normal way (where another location on the tri-state bus can pull the bus low). Open source systems work the same way with the states and polarities reversed.

Description of the problem solved

A typical I/O port is logically constructed as in FIG. 1. There is a data direction register that configures the pin as an input or an output. There is also a data register that holds the data for the port and presents it to the pins that are configured as outputs. If data is read from this port, it will be read from the pin if that pin is configured as an input and from the output of data register if the pin is configured as an output.

As previously stated, normally open drain outputs are pulled high with a resistor located somewhere in the system (somewhere on the tri-state bus). If the system is designed with a combination of open drain (or open source) pins and normal input or output pins on the same port, a problem exists. Namely, the pin data register can change unexpectedly in one of the tri-state bit positions. The present invention solves this problem.

For example, consider an 8 bit port where bit 0 is a normal output and bit 1 is an open drain output which is pulled high by an external resistor. The software first sets the appropriate bit in the DDR to make bit 1 an input. Next the data register entry for bit one is set to zero (setting up the ability to drive pin 1 low if the DDR is changed for that bit). The pin is now in the high impedance state and is being pulled up by the external resistor. Now if the software wants to set or clear bit zero (the normal output), it uses the appropriate bit set or bit clear instruction to do so. Because this is a read modify write operation, the full width of the port is read in, not just bit 0. Since bit 1 is set as an input and the pin is pulled up externally it is seen as a one during this read operation (the processor cannot tell that it is not supposed to process this phantom 1 bit on the read). Consequently, the data bit 1 in the data register will change from 0 to 1 when the data is written back to the port. The effect will only be noticed later when the software wants to cause the pin for bit 1 to sink current (write a 0 to the tri-state bus). It will successfully change the appropriate DDR bit to make bit 1 an output, but the pin will not sink current because the data bit in the data register has been changed to 1 by the phantom read operation. Worse yet, during the bus write operation on pin 1, the processor will drive the pin to a voltage level normally representing a 1 and clamp it there during the write operation (the high impedance normally associated with a tri-state pin now becomes a low impedance clamped at the 1-level voltage). This can prevent any other driver on the bus from pulling it low during this time. Many times tri-state pins (or open collector/drain) are used in so-called wired-OR configurations where several wires are simply tied together to produce a logical OR operation. For a wired-OR to work, any driver tied to it must be able to drive a 0 at any time. The problem just described prevents this during the write time by clamping a 1 level onto the bus during the first processor's attempt to write a 0. Thus if the processor was trying to write a 0 and another device was also trying to write a 0 into a wired-OR, the result should be 0; however do to the problem it is 1.

Software Attempts to Fix the Problem

There are several software workarounds to this problem, but all of them have the drawback of adding to the code size and execution time (reducing or eliminating the value of the bit set or bit clear instructions). One workaround is to set the data bit each time the programmer wants to change the state of the open drain output at a point in the code just before setting the state of the DDR bit. This insures that if any other part of the program has changed the data bit to an improper value, it will be changed back. A major problem with this approach, in addition to the above mentioned problems, is that if the system uses interrupt service routines that also use read modify write operations (on a port that we have an open drain pin), then there is the possibility that the data bit will be changed in the interrupt service routine between the time the program writes it and the write to the DDR. If the system design allows it, interrupts could be disabled before writing the data bit and re-enabled after writing the DDR. But this even adds more code space, execution time and possibly introduces interrupt latency issues. It raises a classical semaphore problem known in operating system theory. It is not a good approach.

Another approach is to set the data after setting the DDR. However, his approach does not really solve the problem as it still allows possible system contention or a glitch on the output during the period that the output is driven, but before the data bit is properly set.

SUMMARY OF THE INVENTION

The present invention solves the read-modify-write problem for mixed tri-state chip processors by implementing a simple hardware change. This change could easily be built into microcontrollers and other chip processors to once and for all solve the problem. The present invention uses at least one logic gate to route data from the output of the data register back to itself instead of from the input pin during reads; the correct value stays in the output register at all times.

Several figures and drawings have been presented in aiding understanding of the many ways to fix the problem presented. The scope of the present invention is not limited to the circuits shown in the figures. Many other embodiments of the present invention are possible and are within its scope.

DETAILED DESCRIPTION OF THE INVENTION

Figure 1:
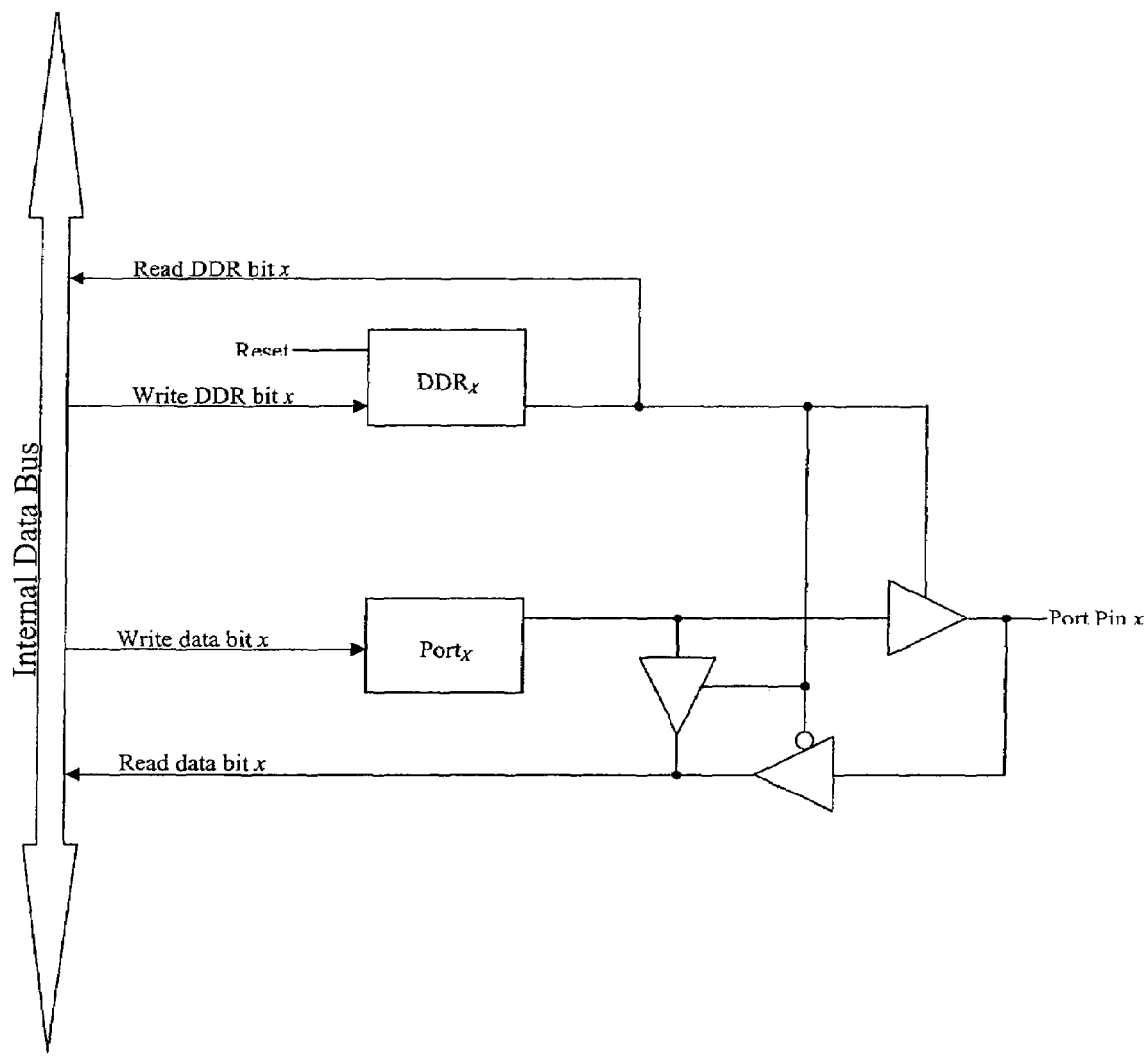
FIG. 1 shows a input/output port on a typical prior art chip processor.
Figure 2:
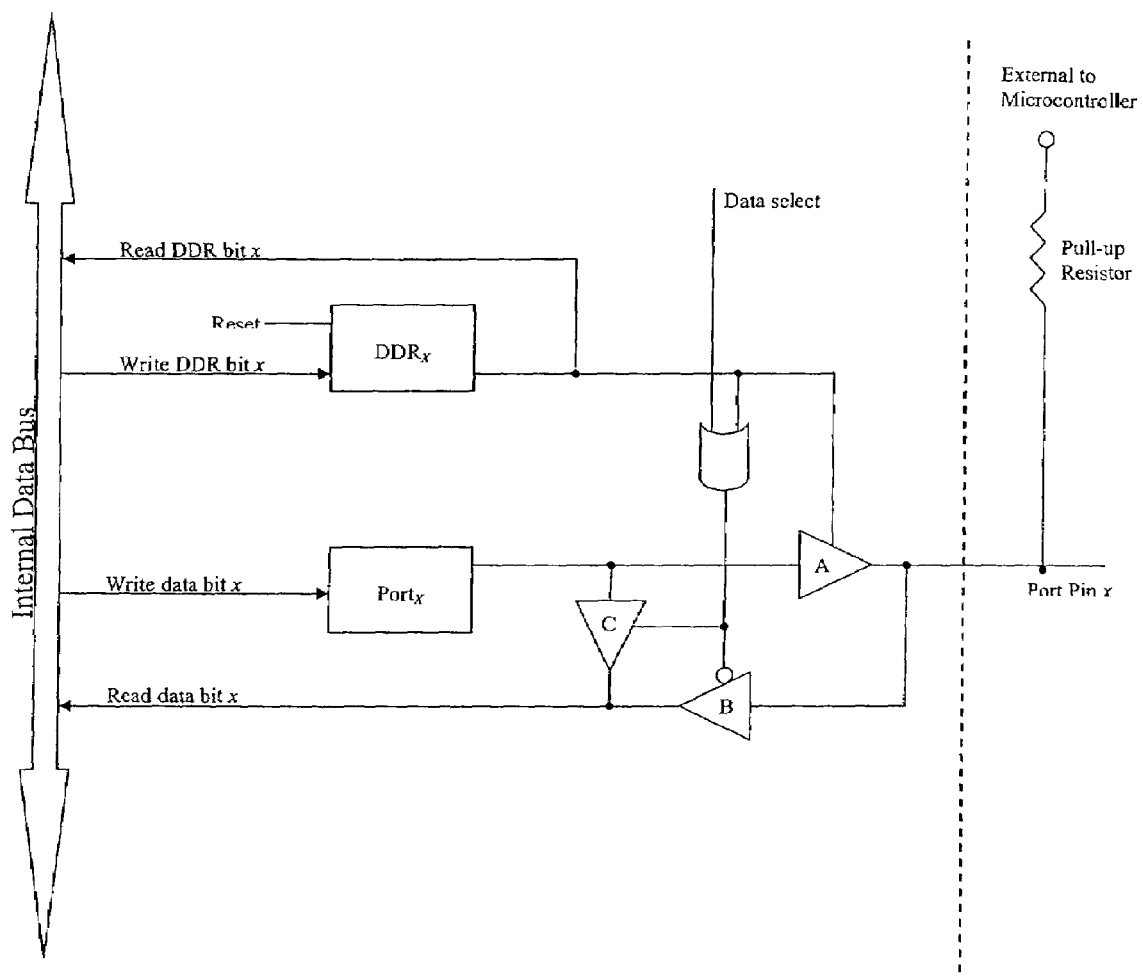
FIG. 2 shows an embodiment of the present invention applied to the circuit of FIG. 1.

If during a bit set or reset instruction the data on pins that were configured as inputs is routed from the output of the data register back to itself instead of the input pin, the problem could not exist. This would only need to be done during the read portion of the read modify write operation, but could be done during the whole instruction. In a typical I/O port, an OR gate can be added as shown in FIG. 2. This gate allows control of whether the data is read from the pin or from the data register itself on a data read. The control input to the OR gate (marked data-select in FIG. 2) can be brought high during the bit set or bit clear instruction execution. This control signal steers the data into the data register. This solution of the present invention preserves all of the advantages of the original bit set and bit clear instructions.

The execution of a bit set or bit clear instruction is then as follows: The processor control logic brings the input to the OR gate high (Data-Select→1). This causes the output of the OR gate to go high. This in turn causes the tri-state buffer "B" to isolate the input pin from the node read data bit x and causes the tri-state buffer "C" to drive it's output onto the node read data x. This effectively overrides the normal control from the data direction register to the source of the input bit. The output of the tri-state buffer "C" is now at the same logic level as the output of the data register. In the case of an open drain output this data level would be a zero.

The processor control logic then reads the data from the port performing the normal masking operation. Next the processor control writes the resultant data back to the port, and finally the processor control brings the control signal low (Data-Select→0). When an op-code to read the port is executed, the Data Select input is left in its normal state i.e. low. This causes control of tri-state buffers "B" and "C" to be under the control of the data direction register. The data select inputs from each OR gate on the port (there is one for each bit) could be connected together so that only one data select control point is used to control all of the bits in the port. Furthermore, this port wide data select control point can be combined with the port wide data select control point from any of the other ports in the microcontroller. Even though these points are connected together, the only data that will be affected will be at the port that is being accessed during the read modify write cycle. Since op-codes are executed as atomic operations, and the data select control points will returned to a low state after a bit set or bit clear operation, there is no problem changing the data select signal on all ports at the same time.

This solution can also be used in chip-processor that do not have bset or blcr instructions. In these processors, another op-code could be added that would return the value of the data register regardless of the state of the direction of pin. Then when a "longhand" read modify write sequence of operations was performed, there still would be a savings in execution time. When used with a microcontroller, the solution of the present invention can be on the same die as the microcontroller or external to it.

Figure 3:
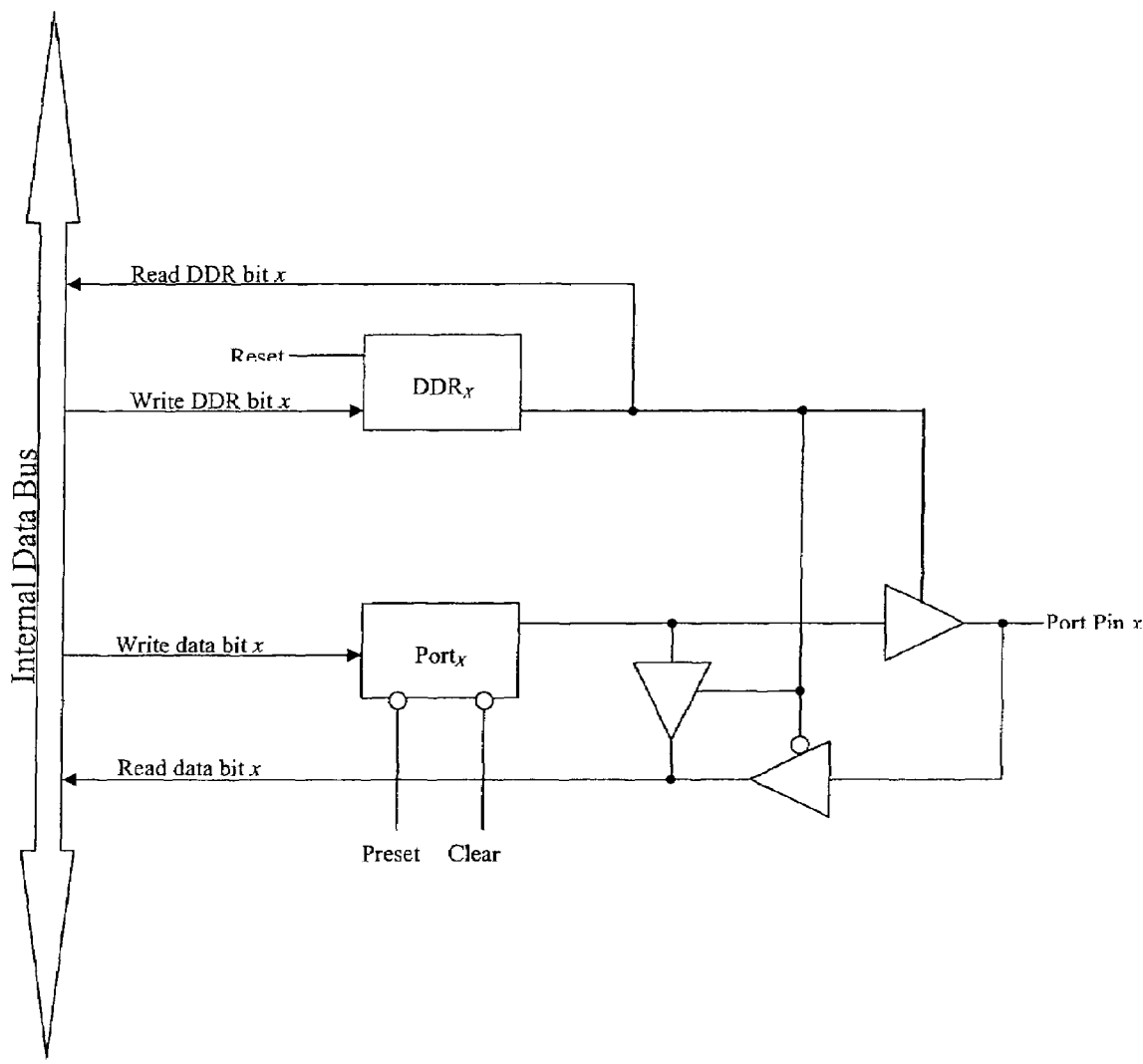
FIG. 3 shows an alternate embodiment of the present invention that also fixes the problem.

Another embodiment of the present invention is to implement the ports with the ability to independently set or clear individual data bits in the port. On way of doing this is to use data registers that also have independent set and clear inputs. The bit-set or bit-clear instruction would then be made to activate the appropriate set or clear input. FIG. 3 show an example of this embodiment. Here, an op-code for bit-set or bit-clear would not be a read modify write operation. During the execution of a bit-set or bit-clear op-code the control logic in the microcontroller would use the port address, and the bit to be set or cleared (usually specified as an operand but could be in the op-code itself) to decode and activate the proper set or reset control point in the port. This embodiment requires a separate control point for each bit to be set or reset within each port that will capable of bit-set or bit-clear operations.

The present invention has been illustrated and described with text and figures to better aid in understanding. One skilled in the art will recognize the many variations and changes are possible. In particular, many different circuit implementations of the present invention are possible. All of these changes and variations are within the scope of the present invention.

I claim:

1. A method of solving a read-modify-right problem with chip processors where a tri-state output is achieved in a first state by setting a bit position in an input/output port to read, and a second state by setting the port to write with a fixed value in a data register, the problem causing the data register to change during read of the read-modify-write, the improvement comprising:

controlling the input path to said data register during a read-modify-write operation by routing said data register's output back to said data register's for said bit position during a read-modify-write operation and routing input from an input pin to said data register's input during a read operation.

2. The method of claim 1 wherein said routing is controlled by a logical OR gate.

3. An electronic circuit for use in a open-drain/open-collector arrangement from a chip processor including a logical circuit that routes data from a bit position in an output/input data register back to itself during a read-modify-write operation and routes data into said register from a pin during a read operation.

4. The electronic circuit of claim 3 wherein said logical circuit includes an OR gate.

5. The electronic circuit of claim 3 wherein said circuit is used in a microcontroller.

6. The electronic circuit of claim 5 wherein said circuit is on a same die as said microcontroller.

* * * * *